(12) United States Patent
Fitz et al.

(10) Patent No.: US 6,716,468 B1
(45) Date of Patent: Apr. 6, 2004

(54) SAVOURY FLAVOR COMPRISING 2-METHYLFURAN-3-THIOL AND/OR A DERIVATIVE AND METHYLENEDITHIOL AND/OR A DERIVATIVE

(75) Inventors: Wolfgang Fitz, Amsterdam (NL); Andries Van Delft, Loosdrecht (NL); Josef Kerler, Naarden (NL); Theodorus Gerardus Maria Hesp, Huizen (NL); Willem Apeldoorn, Amsterdam (NL); Gerrit Hendrik Altena, Huizen (NL)

(73) Assignee: Quest International B.V., Naarden (NL)

( * ) Notice: Subject to any disclaimer, the term of this patent is extended or adjusted under 35 U.S.C. 154(b) by 0 days.

(21) Appl. No.: 09/677,780

(22) Filed: Oct. 2, 2000

(30) Foreign Application Priority Data

Sep. 30, 1999 (EP) .............................. 99203197

(51) Int. Cl.⁷ ................................. A23L 1/22
(52) U.S. Cl. ................. 426/535; 426/534; 426/650
(58) Field of Search ................. 426/533, 534, 426/535, 660

(56) References Cited

U.S. PATENT DOCUMENTS 3,255,075 A    6/1966  Fielding
3,879,562 A    4/1975  Pittet et al.

FOREIGN PATENT DOCUMENTS

DE    20 04 303 A    8/1970
GB    1 283 912 A    8/1972

OTHER PUBLICATIONS

Morton et al. eds., Food Flavours Part A. Introduction, 1982, pp. 173–176, Elsevier Scientific Publishing Company, New York.*

Güntert et al., 'Thermally Degraded Thiamin—A Potent Source of Interesting Flavor Compounds,' ACS Symp. Ser., vol. 490, pp. 140–163, (1992)—XP000864382.

Hincelin et al., 'The Effect of Xylose on the Generation of Volatiles From Heated Thiamine,' Food Chemistry, vol. 44, pp. 381–389 (1992)—XP–000864381.

* cited by examiner

*Primary Examiner*—Leslie Wong
(74) *Attorney, Agent, or Firm*—Fitch, Even, Tabin & Flannery

(57) ABSTRACT

The invention relates to foodstuffs having a savory flavor, to a process for their preparation and to compositions having a savory flavor which products comprise (hydrogenated) 2-methyl-3-furanthiol and/or a derivative thereof and methanedithiol and/or a derivative thereof. Under derivatives are here to be understood their esters like thioacetates, their thioethers like methyl sulfides their disulphides etc. The combination of the above identified two groups of sulphur compounds in ppb levels leads to a foodstuffs with powerful flavor reminiscent of beef broth.

16 Claims, No Drawings

SAVOURY FLAVOR COMPRISING 2-METHYLFURAN-3-THIOL AND/OR A DERIVATIVE AND METHYLENEDITHIOL AND/OR A DERIVATIVE

The present invention relates to flavoured foodstuffs and flavouring compositions. More in particular the present invention relates to foodstuffs having a savoury flavour and to flavouring compositions suitable for imparting such a flavour. Under a savoury flavour is here to be understood a flavour associated with meat, sausage, poultry, cheese etc. The term foodstuff as used herein includes both solid and liquid ingestible materials which may or may not have nutritional value.

Flavoured foodstuffs having a savoury flavour and flavouring compositions for imparting to and/or enhancing in a foodstuffs a savoury flavour have been known for a long time, but so far these compositions were not been quite satisfactory. Therefore the present invention aims to improve the organoleptic properties.

Many compounds have been used to impart a savoury flavour to foodstuffs and therefore most of the compositions used for a savoury flavour contain a multitude of compounds. One group of particular useful compounds for savoury flavours are certain (hydrogenated) furan thiols and derivatives thereof like thio-acetates are e.g. disclosed and/or claimed in GB-A-1 283 912 (Unilever). GB-A-1 256 462 (International Plavours and Fragrances) also discloses certain furan thiols such as 2-methylfuran-3-thiol and it derivatives such as its disulphide and other sulphides as meat flavours. Especially 2-methylfuran-3-thiol and its precursors are powerful flavouring compounds capable of imparting a pleasant roast meat flavour to foodstuffs [cf e.g. "Volatile compounds in foods en beverages" methyl-3-furyldithioby H. Maarse (ED) Marcel Dekker, New York (1991)]. Its powerful roast or fried beef note is, however, not always appreciated. Therefore attempts have been made to obtain products with a powerful, somewhat milder, more rounded off meat flavour more reminiscent of the flavour of boiled beef and beef broth.

The present invention solves the problem of obtaining a powerful mild beef flavour reminiscent of beef broth, and boiled beef which is especially needed for soups, sausages, pastry etc. Also varying the relative amounts of the key components the present invention enables the flavourist to prepare flavouring compositions varying from a mild roast beef flavour to a mild beef broth flavour.

In a first embodiment the present invention therefore provides a flavoured foodstuff comprising an effective amount of at least one compound with a (hydrogenated) 2-methyl-3-furyl-thio moiety and a hydrogen atom, an —S—CH$_3$ group, an —CO—CH, group or a 2-methyl-3-furyl-thio moiety and an effective amount of at least one compound having the structure

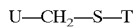

in which C, H and S have the conventional meanings of carbon, hydrogen and sulphur atoms respectively, U represents a thiol group, a lower thioacyl group, a lower thioalkylgroup, a hydroxyl group or a 2-methyl-3-furyldithio group and T represents a hydrogen atom, a lower acyl group or a 2-methyl-3-furyl-thio group or a —S—CR$_2$—U group as defined above.

Suitable compounds in the practice of the present invention having a (hydrogenated) 2-methyl-3-furyl-thio moiety and a hydrogen atom, an —S—CH$_3$ group, an —CO—CH$_3$ group or a 2-methyl-3-furyl-thio moiety are e.g. 2-methylfuran-3-thiol, 2-methyl-4,5-dihydrofuran-3-thiol, cis/trans 2-methyltetra-hydrofuran-3-thiol, 2-methyl-3-thiomethoxyfuran, methyl-2-methyl-3-furyldisulphide, 2-methylfuran-3-thioacetate, 2-methylfuran-3-thiopropionate and the disulphide of 2-methylfuran-3-thiol. The use of non-hydrogenated furan derivatives is preferred. Several of these compounds are available from Oxford Chemicals, Hartlepool, U.K. It is observed that 2-methylfuran-3-thiol like many other thiols is liable to oxidise partially under the influence of oxygen in the atmosphere to its disulphide and consequently quite often commercially available 2-methylfuran-3-thiol preparations contain certain amounts of its disulphide. Thioesters like 2-methyl-3-furan-3-thioacetate and e.g. 2-methyl-3-furan-3-thiopropionate may hydrolyze partially to form 2-methyl-3-furan-3-thiol under certain food processing conditions. This may apply e.g. under the conventional sterilising conditions after canning.

Suitable compounds for the practice of the present invention having a (hydrogenated) 2-methyl-3-furyl-thio moiety and a hydrogen atom, an —S—CH$_3$ group, an —CO—CH$_3$ group or a 2-methyl-3-furyl-thio moiety and an effective amount of at least one compound having the structure

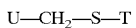

in which C, H and S have the conventional meanings of carbon, hydrogen and sulphur atoms respectively, U represents a thiol group, a lower thioacyl group, a lower thioalkylgroup, a hydroxyl group or a 2-methyl-3-furyldithio group and T represents a hydrogen atom, a lower acyl group or a 2-methyl-3-furyl-thio group or a —S—CH$_2$—U group as defined above are methanedithiol, methanedithiol diacetate, methylthiomethanol, methylthiomethanethiol, methylthiomethanethiol acetate, methylthiomethanethiol propionate, methylthiomethanethiol 2-methylpropionate, methylthiomethanethiol 2-methylbutanoate, methylthiomethanethiol 2-methylbutanoate, 3-methylthiomethanethiol pentanoate, methylthiomethanethiol 4-methylpentanoate and methylthiomethanethiolhexanoate. Some of these compounds are to be regarded as precursors of the corresponding free thiols, whereas others have organoleptic properties resembling methanedithiol or methylthiomethanol etc. with slightly different flavour notes. Here also the possibility arises that free thiols are partially converted to corresponding disulphides under oxidising conditions and also thioesters may hydrolyse to form free thiols under certain food processing conditions.

The present invention not only covers foodstuffs flavoured by incorporating the above identified compounds per se, but also foodstuffs incorporating precursors of the above identified compounds.

2-Methyl-3-furanthiol and some of its derivatives discussed above can be obtained or synthesized as such, but it may also be convenient to prepare a meat/beef flavour composition containing one or more of these compounds (a reaction flavour composition) which comprises at least one of these compounds in a suitable quantity and incorporate in such a composition a suitable amount of a compound having the structure U—CH$_2$—S—T. Suitable reaction flavour compositions can be prepared by reacting a hexose or pentose with a source of hydrogen sulphide such as cysteine in water as a solvent. Instead of a hexose or pentose a suitable degradation product of a sugar can be used such as e.g. 4-hydroxy-5-methyl-2,3-dihydrofuran-3-one and ascorbic acid may also be used. It is also quite possible to prepare suitable reaction flavours containing 2-methyl-3-furanthiol by thermal degradation of thiamine. Several possibilities and reaction mechanisms of reaction flavours are discussed by Hoffmann & Schieberle in J. Agric. Food Chemistry, 46, 235–241 (1998) which is hereby incorporated by reference.

The flavouring compositions according to the present invention are especially incorporated in foodstuffs such as sausage, meat, reformed communicated meat, meat replacers such as texturized vegetable protein, and pastry products in an effective amount, i.e. in an amount sufficient to impart or reinforce the desired flavour. As a general guide flavouring amounts of 0.01 to 1000, preferably 0.5 to 100 ppb (parts per billion=$1:10^9$) are incorporated in foodstuffs which proportions are expressed as one a weight basis calculated on the foodstuff. The flavouring amounts actually incorporated depend on the individual palate and on the nature of the foodstuff. In flavouring compositions the amounts present may easily be a factor 10 to 10,000 higher than in the actual flavoured foodstuff.

Preferably the present invention provides a flavoured foodstuff as defined above, in which lower thioacyl- and lower acyl group means that these groups comprise from 2 to 6, preferably 2 or 3 carbon atoms.

Preferably the present invention provides a flavoured foodstuff as defined above, in which U represents a lower thioacyl group and T represents a lower acyl group.

More preferably the present invention provides a flavoured foodstuff as defined above, in which lower thioacyl group means thioacetoxy and lower acyl group independently means acetyl.

In another embodiment the present invention provides a process for imparting a savoury flavour to a foodstuff comprising incorporating in said foodstuff an. effective amount of at least one compound with a 2-methyl-3-furyl-thio moiety and a hydrogen atom, an —S—CH$_3$ group, an —CO—CH$_3$ group or a (hydrogenated) 2-methyl-3-furyl moiety and an effective amount of at least one compound having the structure

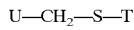

in which C, H and S have the conventional meanings of ah carbon, hydrogen and sulphur atoms respectively, U represents a thiol group, a lower thioacyl group, a lower thioalkylgroup, a hydroxyl group or a 2-methyl-3-furyldithio group and T represents a hydrogen atom, a lower acyl group or a 2-methyl-3-furyl-thio moiety or a —S—CH$_2$—U group as defined above.

Preferably the above process according to the present invention employs compounds as defined above, in which lower thioacyl-, lower alkyl- and lower acyl group means that these groups comprise from 2 to 6, preferably 2 or 3 carbon atoms.

More preferably the above process according to the present invention employs at least one compound as defined above, in which U represents a lower thioacyl group or a lower acyloxy group and T represents a lover acyl group.

In an other embodiment the present invention provides a flavouring composition for foodstuffs comprising at least one compound comprising a (hydrogenated) 2-methyl-3-furyl-thio moiety and a hydrogen atom, an —S—CH$_3$ group, an —CO—CH$_3$ group or a (hydrogenated) 2-methyl-3-furyl-thio moiety and at least one compound having the structure

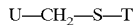

in which C, H and S have the conventional meanings of carbon, hydrogen and sulphur atoms respectively, U represents a thiol group, a lower thioacyl group, a hydroxyl group or a 2-methyl-3-furyldithiogroup and T represents a hydrogen atom, a lower alkyl group or a lower acyl group. Such a flavouring composition can be used for enhancing an existing weak savoury flavour e.g. to compensate for flavour notes lost by processing foodstuffs, but they can equally be used for flavouring a bland or tasteless foodstuff. Moreover it is also possible to change the flavour characteristics of a foodstuff completely. Flavouring compositions are frequently available in the form of active material in a suspension or a solution or upon an organoleptically inactive material.

Preferably the flavouring composition for foodstuffs according to the present invention comprises at least one or more compounds as defined above, in which lower thioacyl-, lower alkyl- and lower acyl group means that these groups comprise from 2 to 6, preferably 2 or 3 carbon atoms.

The flavouring compositions for foodstuffs may be in liquid or semi-liquid form such as solutions, emulsions or pastes, or in dry form such as a powder. Drying can be accomplished for example by spray-drying or by freeze-drying, optionally on a carrier such as maltodextrin.

The present invention is not restricted to at least one compound with a (hydrogenated) 2-methyl-3-furanthiol (derivative) together with at least one compound with a methylenedithiol (derivative) as defined above. As is common in flavour creation other compounds known to contribute to a savoury flavour can be incorporated as well. Such known compounds are e.g. amino acids, nucleotides, monosodiumglutamate, lower alcohols, lower carboxylic acids, pyrrolidone carboxylic acid, lower peptides, sweeteners, lactones, lower disulphides, lower thiols, guanidines etc., salts like NaCl, amines, lower aldehydes, lower ketones, tricholomic acid, biotenic acid, aromatic and/or heterocyclic compounds like acetyl thiazole, 2-hydroxyethyl-4-methylthiazol, 4-hydroxy-2,5-dimethyl-2, 3-hydrofuran-3-one, colouring materials, thickening agents. The proportions of these optionally added substances used are dependent on the kind of flavour desired and also on the nature of the foodstuffs in which they are incorporated and also on any herbs or spices added.

According to another embodiment the present invention provides the use of both an effective amount of at least one compound with a (hydrogenated) 2-methyl-3-furyl-thio moiety and a hydrogen atom, an —S—CH$_3$ group, an —CO—CH$_3$ group or a 2-methyl-3-furyl-thio group and an effective amount of at least one compound having the structure

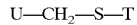

in which C, H and S have the conventional meanings of carbon, hydrogen and sulphur atoms respectively, U represents a thiol group, a lower thioacyl group, a lower thioalkylgroup, a hydroxyl group or a 2-methyl-3-furyldithio group and T represents a hydrogen atom, a lower acyl group or a 2-methyl-3-furyl-thio group or a —S—CH$_2$—U group as defined above.

According to another embodiment of the present invention provides a process for preparing a pure compound with at least one free thiol group as defined in claim 1 by hydrolysing the corresponding thioacyl compound in the presence of an enzyme or a cation exchange resin.

More preferably the process defined above comprises the use of a lipase. More in particular lipases like lipase 435 ex NOVO, Denmark can be used with good results.

The invention will be illustrated by the following examples in which all parts and percentages etc. are on a weight basis unless otherwise indicated.

EXAMPLE 1

Methanedithiol Diacetate

Diiodomethane (26.8 g, 0.1 mole) was dosed to a mixture of 250 ml acetone, potassium thioacetate (30 g) and molecular co sieves 3A (5 g) over 20 minutes at 20° C. The reaction temperature rose to 38° C. (without external cooling). The mixture was stirred during 2 hours at room temperature and quenched in 500 ml water. The resulting mixture was extracted three times with 100 ml methyl tertiary butylether (MTBE) each. The MTBE extracts were joined, washed twice with 100 ml water and dried over anhydrous magnesium sulphate. The solvent was evaporated using a rotavapour (water bath 30° C. at 8 Kpa (80 mbar). Obtained were 18 g concentrate. The concentrate was distilled using a 10 cm Vigreux column. Obtained were 13.5 g distillate with a boiling point of 86° C. at 0.3 Kpa (3 mbar). According to gas chromatography the distillate was more than 99% pure and its NMR data matched. Yield 85% of the theoretical yield.

EXAMPLE 2

Methanedithiol

Methanedithiol diacetate (10 g) was dissolved in methanol (80 g) containing 2 g of gaseous hydrochloric acid and the mixture was stirred overnight at room temperature. The solution was quenched in 200 ml water and the obtained solution was three times extracted with each 50 ml dichloromethane. The dichloromethane extracts were joined, washed with 50 ml water and dried over anhydrous magnesium sulphate. The dichloromethane was evaporated using a 10 cm Vigreux column until a bottom temperature of 20° C. at 4.3 Kpa (43 mbar) was reached. Obtained were 8 g concentrate. The concentrate was distilled with the same apparatus. Obtained were 3.5 g distillate with a boiling point of 35° C. at 4.3 Kpa. The NMR data matched and the yield was 70% of the theoretical yield. The distillate was a suitable ingredient for a savoury flavour composition according to the invention.

EXAMPLE 3

Methanedithiol

Methanedithiol diacetate (4.9 mole, 0.80 g) obtained as described above was taken up in pentane (5 g) as solvent and transesterified with ethanol (10.9 mmol) and lipase SP 435 ex NOVO as catalyst. The ethanol was slowly added over 12 hours. The total reaction time was 12 hours at 20° C. Gas chromatographic analysis indicated that the conversion was quantitative. Subsequently the enzyme immobilisate was filtered off and the pentane solution concentrated. The reaction mixture was analyzed with NMR and matched. The results are tabulated below:

| Substance | Molar ratio |
| --- | --- |
| Ethyl acetate | 9 |
| Methanedithiol | 8 |

The concentrate was diluted with ethanol and found to contribute to form an excellent cooked meat flavour especially in combination with 2-methyl-furan-3-thiol.

EXAMPLE 4

Methylthiomethanethiol Acetate

Chloromethylmethylsulphide (4.8 g, 50 mmole) in methyl tert.-butylether (50 mL) as solvent was treated at 10–12° C. with thioacetic acid (4.0 g, 50 mmole), dissolved in methyl tert. butylether (2 mL). Subsequently triethylamine (5.1 g, 50 mmole) in methyl tert. butyl ether (2 mL) were added to the reaction mixture at 14–16° C. The reaction mixture was stirred for 3 hours at 20° C. Water (200 mL) was added and the mixture was stirred for 15 minutes. The organic layer was separated, and the aqueous layer was extracted twice with methyl tert. butyl ether. The combined extracts were dried over anhydrous magnesium sulphate, filtered and concentrated. The residue was distilled and fractionated under reduced pressure. The results are tabulated below:

| Fraction | Bottom temperature | Top temperature | Pressure | Amount |
| --- | --- | --- | --- | --- |
| 1 | 97° C. | 96° C. | 5.4 Kpa | 0.2 g |
| 2 | 105° C. | 104° C. | 5.4 Kpa | 0.9 g |
| 3 | 112° C. | 105° C. | 5.4 Kpa | 3.2 g |

Fractions 2 and 3 were satisfactory for flavouring purposes.

EXAMPLE 5

Methylthiomethanethiol

A mixture of methylthiomethanethiol acetate (2.04 g, 15 mmole) and a 15% aqueous sodium hydroxide solution (14.8 g) was stirred for 2 hours at 75° C. The mixture was cooled to 0–5° C. and a 10% aqueous Hcl solution (21.7 g) was slowly added at 0–5° C. The mixture was extracted with ether three times, and the combined ether extracts were dried over anhydrous magnesium sulphate. After filtration and concentration of the filtrate the residue was distilled at 75° C. at 8.0 Kpa (60 Torr) to give 0.19 g of the pure title compound and was a suitable ingredient for flavouring compositions.

EXAMPLE 6

Methylthiomethanethiol

Methylthiomethanethiol acetate was transesterified with ethanol by the method described in Example 3 above to yield a solution of methylthiomethanethiol in ethanol. As indicated by gas chromatographic analysis the conversion into methylthiomethanethiol was complete after 12 hours. The solution was satisfactory for flavouring purposes.

EXAMPLE 7

Methylthiomethanethiol

Sodium sulphide hydrate (0.25 g) was covered with dichloromethane. A buffer solution of Ph 5.3 (NaOAc/HOAc) (82 g sodium acetate and 25.3 g acetic acid dissolved in water, total volume 711 Ml) was carefully poured on the dichloromethane, followed by formaldehyde 37% in water (20.2 g, 0.25 mmol). The bottle was purged with nitrogen and closed with a screw cap with a silicon rubber septum. The mixture was stirred magnetically for three days. The aqueous layer was extracted with dichloromethane. The crude product, in dichloromethane as solvent had a composition as tabulated below:

| Substance | Molar ratio |
| --- | --- |
| Methylthiomethanethiol | 3–4 |
| Methanethiol | 2 |
| Methylthiomethanol | 1 |

The solvent was removed under reduced pressure and the product was distilled twice under reduced pressure to yield a product fraction which distilled at 45–47° C. at 2 Kpa (20 mbar). The product fraction, which was a suitable meat flavour component, had a composition as tabulated below.

| Substance | Molar ratio |
| --- | --- |
| Methylthiomethanethiol | 16.5 |
| Methanethiol | 2.4 |
| Methylthiomethanol | 1 |

The three main components are responsible for 75% of the integral in the NMR.

EXAMPLE 8

Various Disulphides 2-methylfuran-3-thiol (10 mg) and methylthiomethanethiol (10 mg) were taken up in 1 mL ethanol in the presence of basic aluminium trioxide. The mixture was stirred for 20 hours at 20° C. under a slight overpressure of oxygen. Subsequently the aluminium trioxide was removed from the solution by centrifuging. The centifuged solution was a valuable ingredient for savoury flavours. The solution was analyzed by GC/MS and the results are tabulated below.

| Compound | % | GC/MS data |
| --- | --- | --- |
| 2-Methylfuran-3-thiol | trace | |
| Methylthiomethanethiol | trace | |
| Bis(2-methylfuran-3-)-disulphide | 29% | 226(79), 162(9), 155(7), 113(110), 85(15), 43(9) |
| Bis(methylthiomethane)-disulphide | 29% | 186(29), 153(6), 93(8), 61(100), 45(15) |
| (2-Methylfuran-3)-methylthiomethanedisulphide | 31% | 206(40), 113(39), 95(48), 93(11), 61(100), 45(14) |

EXAMPLE 9

A reaction flavour block with flavour type meaty/beefy was prepared by the thermal reaction of xylose with cysteine hydrochloride in water as the solvent, followed by spray-drying the reaction mixture on a maltodextrin 10 support. The spray-dried flavouring composition contained 2-methyl-3-furanthiol at a concentration of 20 ppm. An amount of 0.5 g of the spray-dried beef flavour was dissolved in 1 L water with a temperature of 50° C. containing sodium chloride (5 g). The resulting solution (test solution A) contained 2-methyl-3-furanthiol at a concentration of 10 ppb (parts per billion). To a 0.5 L aliquot of mixture A were added 25 microliters of a solution of methylthiomethanethiol in water (200 ppm). The obtained solution (test solution B) contained 2-methyl-3-furanthiol at a concentration of 10 ppb and methylthiomethanethiol at a concentration of 10 ppb. The flavoured test solutions were evaluated by a panel of four experienced tasters. Three out of the four tasters found test solution B to possess a distinctly cooked note, which was absent in test solution A.

EXAMPLE 10

Four savoury flavour compositions were prepared by mixing the following ingredients in the amounts (parts per thousand) indicated in the table below:

The four mixtures A, B, C and D so obtained were added separately to a test solution (50° C., containing 5 g/L sodium chloride) at a level of 0.04 g per liter. The flavoured test solutions were evaluated by a panel of four experienced tasters. Three of the four tasters described both mixtures C and D as having an enhanced cooked note in comparison with mixtures A and B. Three experienced tasters were of the opinion that both mixtures C and D displayed a less brown and roasted note than mixture B.

| Compound | Mixt. A | Mixt. B | Mixt. C | Mixt. D |
| --- | --- | --- | --- | --- |
| Hexanal | 11.4 | 11.4 | 11.4 | 11.4 |
| Nonanal | 2.0 | 2.0 | 2.0 | 2.0 |
| t-2-Heptenal | 1.2 | 1.2 | 1.2 | 1.2 |
| t-2-Octenal | 1.2 | 1.2 | 1.2 | 1.2 |
| t-2-Nonenal | 1.2 | 1.2 | 1.2 | 1.2 |
| t-2-Decenal | 3.5 | 3.5 | 3.5 | 3.5 |
| t,t-2,4-Heptadienal | 1.0 | 1.0 | 1.0 | 1.0 |
| t,t-2,4-Nonadienal | 0.8 | 0.8 | 0.8 | 0.8 |
| t,t-2,4-Decadienal | 20.8 | 20.8 | 20.8 | 20.8 |
| (2-Hydroxyethyl)-4-methyl-thiazol | 947.8 | 947.8 | 947.8 | 947.8 |
| 1-Octene-3-ol | 0.6 | 0.6 | 0.6 | 0.6 |
| 1-Hexanol | 3.6 | 3.6 | 3.6 | 3.6 |
| δ-Undecalactone | 0.6 | 0.6 | 0.6 | 0.6 |
| 2-Ethyl-1-hexanol | 0.5 | 0.5 | 0.5 | 0.5 |
| 2-Methyl-3-furanthiol | — | 1.6 | 1.6 | 1.6 |
| Methanedithiol | — | — | 1.6 | — |
| Dithiomethane-diacetate | — | — | — | 1.6 |
| Ethanol (up to 1000) | 3.8 | 2.2 | 0.6 | 0.6 | t = trans; c = cis

What is claimed is:

1. A meat flavoured foodstuff comprising, in an amount of 0.01 to 1000 ppb, a combination of (a) at least one compound with a (hydrogenated) 2-methyl-3-furyl-thio moiety and a hydrogen atom, an —S—CH$_3$ group, an —CO—CH$_3$ group or a 2-methyl-3-furyl-thio moiety and (b) at least one compound having the structure

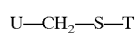

U—CH$_2$—S—T in which C, H and S have the conventional meanings of carbon, hydrogen and sulphur atoms respectively, U represents a thiol group, a lower thioacyl group, a lower thioalkyl group, a hydroxyl group or a 2-methyl-3-furyldithio group and T represents a hydrogen atom, a lower acyl group or a 2-methyl-3-furyl-thio group or a —S—CH$_2$—U group as defined above.

2. A meat flavoured foodstuff according to claim 1, wherein lower thioacyl- and lower acyl group means that these groups comprise from 2 to carbon atoms.

3. A meat flavoured foodstuff according to claim 1 or 2, wherein U represents a lower thioacyl group and T represents a lower acyl group.

4. A meat flavoured foodstuff according to claim 1 or 2, wherein lower thioacyl group means thioacetoxy and lower acyl group independently means acetyl.

5. A process for imparting a savoury flavour foodstuff comprising incorporating in said foodstuff, in an amount of 0.01 to 1000 ppb, a combination of at least one compound with a (hydrogenated) 2-methyl-3-furyl-thio moiety and a hydrogen atom, an —S—CH$_3$ group, an —CO—CH$_3$ group or a 2-methyl-3-furyl- moiety and at least one compound having the structure

U—CH$_2$—S—T in which C, H and S have the conventional meanings of carbon, hydrogen and sulphur atoms respectively, U represents a thiol group, a lower thioacyl group, a lower thioalkyl group, a hydroxyl group or a 2-methyl-3-furyldithio group and T represents a hydrogen atom, a lower acyl group or a 2-methyl-3-furyl-thio group or a —S—CH$_2$—U group as defined above.

6. A process to claim 5, in which lower thioacyl-, lower alkyl- and lower acyl group means that these groups comprise from 2 to 6 carbon atoms.

7. A process according to claim 5 or 6 in which U represents a lower thioacyl group or a lower acyloxy group and T represents a lower acyl group.

8. A flavouring composition for foodstuffs comprising at least one compound comprising a (hydrogenated) 2-methyl-3-lfuryl-thio moiety and a hydrogen atom, an —S—CH$_3$ group, an —CO—CH$_3$ group or a 2-methyl-3-furyl-thio moiety, in an amount of at least 0.1 ppb, and at least one compound having the structure

U—CH$_2$—S—T in which C, H and S have the conventional meanings of carbon, hydrogen and sulphur atoms respectively, U represents a thiol group, a lower thioacyl group, a hydroxyl group or a 2-methyl-3-furyldithio group and T represents a hydrogen atom, a lower acyl group or a lower acyl group, in an amount of at least 0.1 ppb.

9. A composition according to claim 8, in which lower thioacyl-, lower alkyl- and lower acyl group means that these groups comprise from 2 to carbon atoms.

10. A foodstuff having a meat flavor, said flavor having been imparted by incorporating therein, in an amount of 0.01 to 1000 ppb, a combination of at least one compound with a (hydrogenated) 2-methyl-3-furyl-thio moiety and a hydrogen atom, an —S—CH$_3$ group, an —CO—CH$_3$ group or a (hydrogenated) 2-methyl-3-furyl-thio group and, at least one compound having the structure

U—CH$_2$—S—T in which C, H and S have the conventional meanings of carbon, hydrogen and sulphur atoms respectively, U represents a thiol group, a lower thioacyl group, a lower thioalkyl group, a hydroxyl group or a (hydrogenated) 2-methyl-3-furyldithio group and T represents a hydrogen atom, a lower acyl group or a (hydrogenated) 2-methyl-3-furyl-thio group or a —S—CH$_2$—U group as defined above, sufficient to impart said meat flavor.

11. A process for preparing a pure compound with at least one free thiol group as defined in claim 1 by hydrolyzing the corresponding thioacyl compound in the presence of an enzyme or a cation exchange resin.

12. A process according to claim 11, in which the enzyme is a lipase.

13. A meat flavored foodstuff according to claim 2, wherein said lower thioacyl- and lower acyl group comprise 2 or 3 carbon atoms.

14. A meat flavored foodstuff according to claim 3, wherein lower thioacyl group means thioacetoxy and lower acyl group independently means acetyl.

15. A meat flavored foodstuff according to claim 1, wherein U represents a 2-methyl-3-furyldithio group.

16. A meat flavored foodstuff according to claim 1, wherein T represents a 2-methyl-3-furyl thio group.

* * * * *